(12) United States Patent
Liu et al.

(10) Patent No.: US 11,454,943 B2
(45) Date of Patent: Sep. 27, 2022

(54) SERIAL ISOLATION COMMUNICATION METHOD, DEVICE AND SYSTEM

(71) Applicant: Geo Micro Devices (Xiamen) Co., Ltd, Xiamen (CN)

(72) Inventors: Hengsheng Liu, Shanghai (CN); Yixin Wang, Shanghai (CN); Jiangbo Xu, Shanghai (CN); Zhongjian Hang, Shanghai (CN)

(73) Assignee: GEO MICRO DEVICES (XIAMEN) CO., LTD, Xiamen (CN)

( * ) Notice: Subject to any disclaimer, the term of this patent is extended or adjusted under 35 U.S.C. 154(b) by 84 days.

(21) Appl. No.: 17/100,827

(22) Filed: Nov. 21, 2020

(65) Prior Publication Data
US 2022/0163936 A1 May 26, 2022

(51) Int. Cl.
*G05B 19/042* (2006.01)
*H04L 67/12* (2022.01)
*G01D 21/02* (2006.01)

(52) U.S. Cl.
CPC ......... *G05B 19/0423* (2013.01); *G01D 21/02* (2013.01); *H04L 67/12* (2013.01)

(58) Field of Classification Search
CPC ..... G05B 19/0423; G01D 21/02; H04L 67/42
See application file for complete search history.

(56) References Cited

U.S. PATENT DOCUMENTS

| | | | | |
|---|---|---|---|---|
| 7,103,110 | B2* | 9/2006 | Cohen | H03M 5/08 375/295 |
| 8,644,417 | B2* | 2/2014 | Chang | H04L 25/4917 375/286 |
| 2013/0195155 | A1* | 8/2013 | Pan | H03D 1/00 375/317 |
| 2020/0412479 | A1* | 12/2020 | Le | H03M 13/13 |

FOREIGN PATENT DOCUMENTS

| | | | | |
|---|---|---|---|---|
| CN | 102376312 A | * | 3/2012 | ....... G11B 20/10009 |
| CN | 103118251 A | | 5/2013 | |
| CN | 108153688 A | * | 6/2018 | |
| CN | 108153688 A | | 6/2018 | |
| CN | 109412703 A | * | 3/2019 | ........... H04B 14/026 |

* cited by examiner

*Primary Examiner* — Brian J. Gillis
*Assistant Examiner* — Jsing Forng Lin
(74) *Attorney, Agent, or Firm* — Bayramoglu Law Offices LLC

(57) ABSTRACT

A serial isolated communication method, applied to a transmitter of a serial isolated communication system, includes: obtaining isolated communication data to be transferred; encoding isolated communication data with more than two bits into corresponding data pulse signals according to a preset encoding rule, wherein a group of data pulse signals include a positive pulse, a negative pulse, and a delay of 0 or N pulse widths between the positive pulse and the negative pulse, and N≥1; and transferring the data pulse signals to a receiver. A serial isolated communication method, applied to a receiver of a serial isolated communication system, includes: receiving data pulse signals trans- (Continued)

ferred from a transmitter; decoding the data pulse signals into the isolated communication data according to a preset decoding rule; and obtaining the isolated communication data. Serial isolated communication device and system are further provided.

8 Claims, 5 Drawing Sheets

SERIAL ISOLATION COMMUNICATION METHOD, DEVICE AND SYSTEM

TECHNICAL FIELD

The present invention relates to the field of communication technology, and more particularly, to a serial isolated communication method, device and system.

BACKGROUND

The degree to which electronic circuits are integrated is ever increasing. In this connection, serial communication protocols are widely used in various industrial fields because of their simple design, stable communication and low cost. In some complex circuit systems, however, such as a battery pack management system, the voltages between batteries are different. Thus, it is necessary to electrically isolate each group of circuits during the circuit design, but the isolated communication data cannot be transmitted by means of direct connection. Consequently, the serial isolated communication method emerged. In prior methods of serial isolated communication, the isolated communication data are encoded into corresponding data pulse signals. The data pulse signals are then used to transmit the isolated communication data. The data pulse signals are specifically a group of upper and lower pulses. When a positive pulse precedes, it indicates "1", and when the negative pulse precedes, it indicates "0". In other words, heretofore, such methods could only transfer 1-bit isolated communication data at a time, which has a slow rate of data transmission. Additionally, the transmission of each bit of data requires one group of upper and lower pulses, resulting in increased power consumption.

Therefore, at present, it is highly desirable to improve the communication rate of the serial isolated communication and reduce the power consumption of transmitting the isolated communication data.

SUMMARY

In view of the above-mentioned problems, an objective of the present invention is to provide a serial isolated communication method, which can improve the communication rate of the serial isolated communication and reduce the power consumption of transmitting the isolated communication data. Another objective of the present invention is to provide a serial isolated communication device and system with the above advantages.

In order to solve the above technical problems, the present invention provides a serial isolated communication method, applied to a transmitter of a serial isolated communication system, including:

obtaining isolated communication data to be transferred;
encoding isolated communication data with more than two bits into corresponding data pulse signals according to a preset encoding rule, wherein a group of data pulse signals include a positive pulse, a negative pulse, and a delay of 0 or N pulse widths between the positive pulse and the negative pulse, and N≥1; and transferring the data pulse signals to a receiver.

Preferably, the delay between the positive pulse and the negative pulse is 0 or 1 pulse width.

Preferably, before transferring the data pulse signals to the receiver, the method further includes:

transferring a start pulse signal to the receiver; and
correspondingly, after transferring the data pulse signals to the receiver, the method further includes:

transferring a stop pulse signal to the receiver.

Preferably, the start pulse signal or the stop pulse signal includes the positive pulse, a delay of M pulse widths, and the negative pulse, wherein M≠N.

Preferably, an amplitude of the delay between the positive pulse and the negative pulse is the average of an amplitude of the positive pulse and an amplitude of the negative pulse.

In order to solve the above technical problems, the present invention further provides a serial isolated communication device, applied to a transmitter of a serial isolated communication system, including:

a first acquisition module, configured to obtain isolated communication data to be transferred;
an encoding module, configured to encode isolated communication data with more than two bits into corresponding data pulse signals according to a preset encoding rule, wherein a group of data pulse signals include a positive pulse, a negative pulse, and a delay of 0 or N pulse widths between the positive pulse and the negative pulse, and N≥1; and a transferring module, configured to transfer the data pulse signals to a receiver.

In order to solve the above technical problems, the present invention provides another serial isolated communication method, applied to a receiver of a serial isolated communication system, including:

receiving data pulse signals transferred from a transmitter;
decoding the data pulse signals into corresponding isolated communication data with more than two bits according to a preset decoding rule, wherein a group of data pulse signals include a positive pulse, a negative pulse, and a delay of 0 or N pulse widths between the positive pulse and the negative pulse, and N≥1; and obtaining the isolated communication data.

In order to solve the above technical problems, the present invention further provides another serial isolated communication device, applied to a receiver of a serial isolated communication system, including:

a receiving module, configured to receive data pulse signals transferred from a transmitter;
a decoding module, configured to decode the data pulse signals into corresponding isolated communication data with more than two bits according to a preset decoding rule, wherein a group of data pulse signals include a positive pulse, a negative pulse, and a delay of 0 or N pulse widths between the positive pulse and the negative pulse, and N≥1; and a second acquisition module, configured to obtain the isolated communication data.

In order to solve the above technical problems, the present invention further provides a serial isolated communication system, including a transmitter and a receiver.

The transmitter includes:

a first acquisition module, configured to obtain isolated communication data to be transferred;
an encoding module, configured to encode isolated communication data with more than two bits into corresponding data pulse signals according to a preset encoding rule, wherein a group of data pulse signals include a positive pulse, a negative pulse, and a delay of 0 or N pulse widths between the positive pulse and the negative pulse, and N≥1; and a transferring module, configured to transfer the data pulse signals to the receiver.

The receiver includes:

a receiving module, configured to receive the data pulse signals transferred from the transmitter;

a decoding module, configured to decode the data pulse signals into corresponding isolated communication data with more than two bits according to a preset decoding rule, wherein a group of data pulse signals include a positive pulse, a negative pulse, and a delay of 0 or N pulse widths between the positive pulse and the negative pulse, and N≥1; and a second acquisition module, configured to obtain the isolated communication data.

The present invention provides a serial isolated communication method, applied to a transmitter in a serial isolated communication system. Compared with the prior art, in the present invention, isolated communication data to be transferred are obtained, isolated communication data with more than two bits are encoded into corresponding data pulse signals according to a preset encoding rule, and a delay of 0 or N pulse widths is added between the positive pulse and the negative pulse, thereby obtaining more pulse waveforms. In this way, the multiple waveforms can be used to represent multi-bit isolated communication data, and more isolated communication data can be transmitted in an identical time, that is, each waveform can transmit more isolated communication data, thereby improving the transmission rate and reducing the power consumption of transmitting the isolated communication data.

In order to solve the above technical problems, the present invention further provides a serial isolated communication device and system, both of which have the above advantages.

BRIEF DESCRIPTION OF THE DRAWINGS

In order to more clearly illustrate the technical solutions of the embodiments of the present invention, the drawings used in the description of the embodiments are described below. The drawings disclose only some embodiments of the present invention. For those having ordinary skill in the art, other drawings can be obtained according to these drawings without creative efforts.

DETAILED DESCRIPTION OF THE EMBODIMENTS

The technical solutions in the embodiments of the present invention will be described clearly and completely below with reference to the drawings in the embodiments of the present invention. Obviously, the described embodiments are preferred embodiments of the present invention and should not be regarded as excluding other embodiments. Based on the embodiments of the present invention, all other embodiments obtained by those having ordinary skill in the art without creative efforts shall fall within the scope of the protection of the present invention.

An objective of the embodiments of the present invention is to provide a serial isolated communication method, which can improve the communication rate of the serial isolated communication and reduce the power consumption of transmitting the isolated communication data. Another objective of the present invention is to provide a serial isolated communication device and system with the above advantages.

In order to enable those skilled in the art to better understand the technical solutions of the present invention, the present invention is further described in detail below in conjunction with the drawings and specific embodiments.

Figure 1:
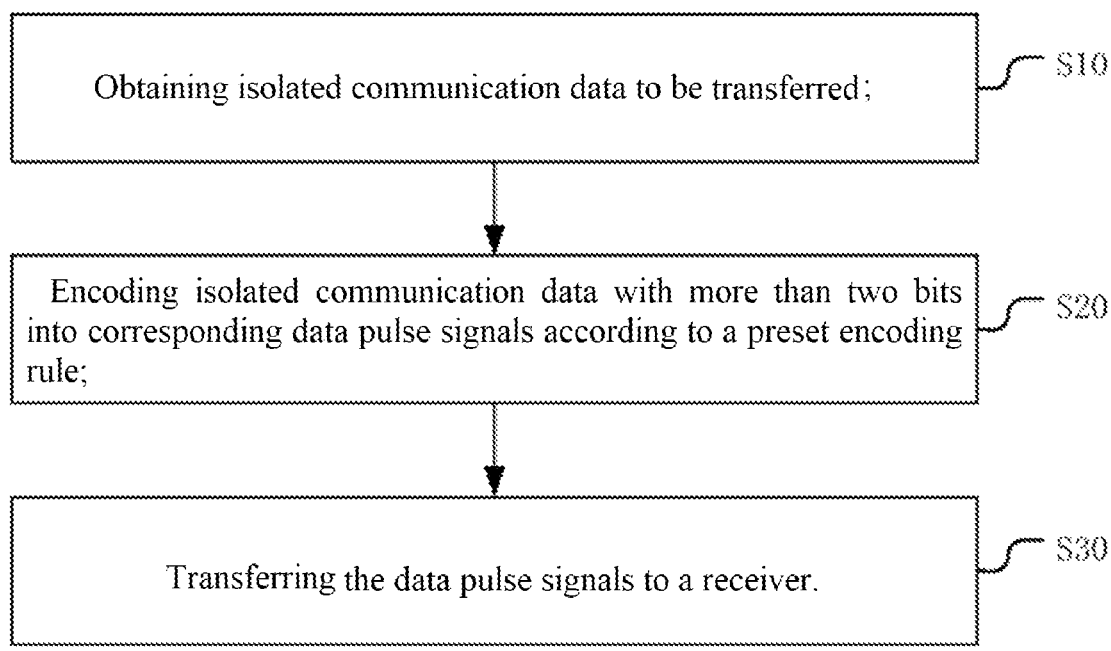
FIG. 1 is a flow chart of a serial isolated communication method according to an embodiment of the present invention.

FIG. 1 is a flow chart of a serial isolated communication method according to an embodiment of the present invention. As shown in FIG. 1, a serial isolated communication method is applied to a transmitter in a serial isolated communication system. The serial isolated communication system further includes a receiver, and the transmitter and the receiver are electrically isolated from each other. It should be understood that in the serial isolated communication system, communication isolation can be achieved by means of capacitor, electromagnetism or photoelectricity. Specifically, the method includes the following steps.

S10: isolated communication data to be transferred are obtained.

It should be noted that the isolated communication data to be transferred refers to the isolated communication data that needs to be transferred to the receiver in the serial isolated communication. Specifically, the isolated communication data may be pre-stored in the isolated communication system. Alternatively, serial command information indicating a corresponding functional unit in the receiver is first generated by the transmitter, and the serial command information is then converted into the corresponding isolated communication data. The serial command information may be generated through a microcontroller or other controllers. The present embodiment does not limit the specific way of obtaining the isolated communication data to be transferred.

S20: isolated communication data with more than two bits are encoded into corresponding data pulse signals according to a preset encoding rule, wherein a group of data pulse signals include a positive pulse, a negative pulse, and a delay of 0 or N pulse widths between the positive pulse and the negative pulse, and N≥1.

S30: the data pulse signals are transferred to a receiver.

Specifically, after the isolated communication data to be transferred are obtained, isolated communication data with more than two bits are encoded into corresponding data pulse signals according to a preset encoding rule. It should be noted that a group of data pulse signals refers to pulse signals within a clock period. The pulse signals include a positive pulse, a negative pulse, and a delay of a preset length between the positive pulse and the negative pulse. The preset length is 0 or N pulse widths, and N≥1. The present embodiment does not limit the preset length.

When N is a variety of fixed values, that is, there are a variety of preset lengths of the delay between the positive pulse and the negative pulse, and each preset length corresponds to a pulse waveform. When N is a fixed value, a group of data pulse signals correspond to four possible pulse waveforms as follows: when the delay between the positive pulse and the negative pulse is 0, the data pulse signals correspond to "positive pulse-negative pulse" or "negative pulse-positive pulse", and when the delay between the positive pulse and the negative pulse is N pulse widths, the data pulse signals correspond to "positive pulse-delay of the N pulse widths-negative pulse" or "negative pulse-delay of the N pulse widths-positive pulse". Moreover, according to the present embodiment, since the isolated communication data with more than two bits are encoded into the corresponding data pulse signals, the four pulse waveforms can be used to represent the isolated communication data with more than two bits, respectively.

Specifically, after the data pulse signals are obtained, the data pulse signals are transferred from an isolated transferring port of the serial isolated communication system to the receiver to realize the serial isolated communication. The data pulse signals may be transferred to the receiver through a coaxial cable or a twisted pair, which is not limited in the present embodiment.

Additionally, it should be noted that in practical operation, the transmitter and receiver of the serial isolated communication system are not fixed, namely, the transmission of the data pulse signals in the serial isolated communication system is bidirectional. For example, a master chip in the serial isolated communication system may be used as both a transmitter and a receiver, depending on the specific actions performed by the master chip.

An embodiment of the present invention provides a serial isolated communication method, applied to a transmitter in a serial isolated communication system. Compared with the prior art, in the present invention, isolated communication data to be transferred are obtained, isolated communication data with more than two bits are encoded into corresponding data pulse signals according to a preset encoding rule, and a delay of 0 or N pulse widths is added between the positive pulse and the negative pulse, thereby obtaining more pulse waveforms. In this way, the multiple waveforms can be used to represent multi-bit isolated communication data, and more isolated communication data can be transmitted in an identical time, that is, each waveform can transmit more isolated communication data, thereby improving the transmission rate and reducing the power consumption of transmitting the isolated communication data.

On the basis of the above embodiments, the technical solution is further explained and optimized in the present embodiment. Specifically, the delay between the positive pulse and the negative pulse is 0 or 1 pulse width.

In an embodiment, the delay between the positive pulse and the negative pulse is specifically 0 or 1 pulse width, that is, either there is no delay between the positive pulse and the negative pulse, or the length of the delay between the positive pulse and the negative pulse is 1 pulse width.

Figure 2:
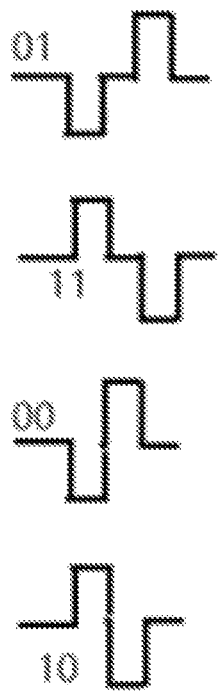
FIG. 2 is a schematic diagram of a representation of the data pulse signals according to an embodiment of the present invention.

Correspondingly, in practical operation, a first pulse signal is transferred, and then a second pulse signal is transferred after a delay of a preset length. The first pulse signal and the second pulse signal are a positive pulse or a negative pulse, respectively, and the preset length is 0 or 1 pulse width. Specifically, a representation of data pulse signals is shown in FIG. 2, that is, when the value of N is 1, four pulse waveforms are obtained according to the sequential order of the positive pulse and the negative pulse and the pulse width of the delay. In addition, in the present embodiment, more specifically, "negative pulse-delay-positive pulse" is used to represent "01", "positive pulse-delay-negative pulse" represents "11", "negative pulse-positive pulse" represents "00", and "positive pulse-negative pulse" represents "10".

In other words, according to an embodiment, four pulse waveforms can be obtained by setting the preset length of the delay as 0 or 1 pulse width, and each pulse waveform is used to represent two-bit isolated communication data. In other embodiments, four pulse signals can further be used to represent data with different bits, which is not limited in the present embodiment.

As a preferred embodiment, the amplitude of the delay between the positive pulse and the negative pulse is the average of the amplitude of the positive pulse and the amplitude of the negative pulse.

Specifically, in the present embodiment, the amplitude of the delay between the positive pulse and the negative pulse is the average of the amplitude of the positive pulse and the amplitude of the negative pulse, namely, in the pulse waveforms of the data pulse signals, the waveform corresponding to the delay is between the amplitude of the positive pulse and the amplitude of the negative pulse to make the data pulse signals more stable.

On the basis of the above embodiments, the technical solution is further explained and optimized in the present embodiment. Specifically, before transferring the data pulse signals to the receiver, the method further includes:

transferring a start pulse signal to the receiver; and
correspondingly, after transferring the data pulse signals to the receiver, the method further includes:
transferring a stop pulse signal to the receiver.

Specifically, in the present embodiment, before transferring the data pulse signals to the receiver, a start pulse signal is first transferred to the receiver to remind the receiver that the data pulse signals will be transferred next. Correspondingly, after transferring the data pulse signals to the receiver, a stop pulse signal is further transferred to the receiver to remind the receiver that the current isolated communication data is already transferred.

As a preferred embodiment, the start pulse signal or the stop pulse signal includes the positive pulse, a delay of M pulse widths, and the negative pulse, wherein M≠N.

In the present embodiment, pulse waveforms of the start pulse signal and the stop pulse signal different from those of the data pulse signals are also obtained in a similar way of setting the length of the delay between the positive pulse and the negative pulse, and then the pulse waveforms are used to represent the start pulse signal of starting transmitting the data pulse signals and the stop pulse signal of stopping transmitting the data pulse signals. In one specific implementation, the delay in the start pulse signal and the stop pulse signal is set as two pulse widths, and then the start pulse signal and the stop pulse signal are correspondingly obtained in combination with the sequential order of the positive pulse and the negative pulse.

Figure 3:
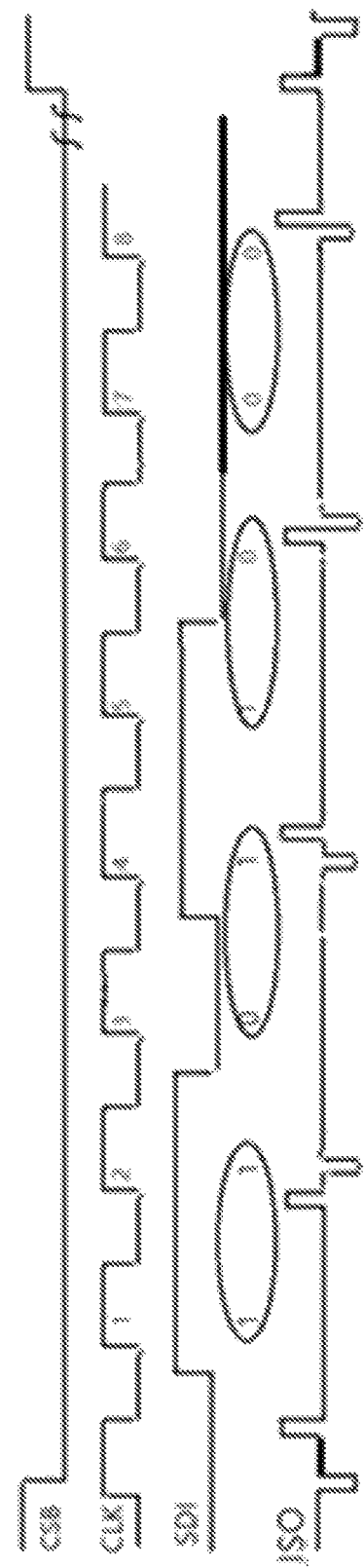
FIG. 3 is a waveform diagram of converting the isolated communication data of the serial peripheral interface (SPI) into the corresponding data pulse signals according to an embodiment of the present invention.

For example, FIG. 3 shows a waveform diagram of converting the isolated communication data of the serial peripheral interface (SPI) into the corresponding data pulse signals according to an embodiment of the present invention, in which, CSB represents the chip selection signal, CLK represents the clock signal, SDI represents the isolated communication data, and ISO represents the corresponding data pulse signals. A delay of two pulse widths is added between a group of a positive pulse and a negative pulse to represent the rising edge and the falling edge of the CSB, so as to correspondingly represent the start and stop of transmitting the data pulse signals, that is, the first pulse waveform of the ISO represents the start pulse signal, and the last pulse waveform of the ISO represents the stop pulse signal.

Figure 4:
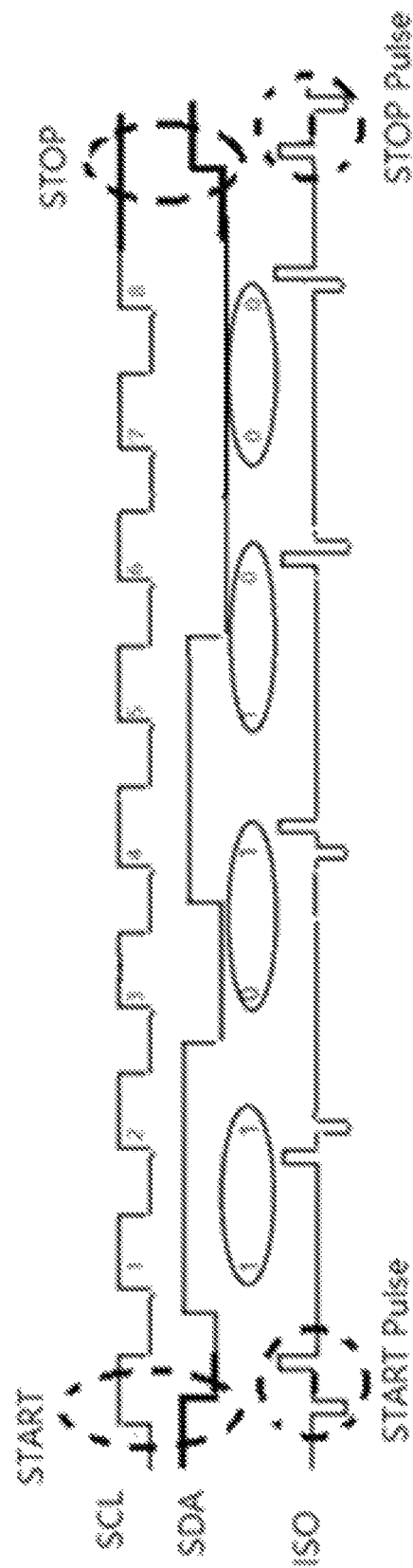
FIG. 4 is a waveform diagram of converting the isolated communication data of the inter-integrated circuit (I2C) into the corresponding data pulse signals according to an embodiment of the present invention.

FIG. 4 shows a waveform diagram of converting the isolated communication data of the inter-integrated circuit (I2C) into the corresponding data pulse signals according to an embodiment of the present invention, in which, SCL represents the clock signal, SDA represents the isolated communication data, and ISO represents the corresponding data pulse signals. When the data line SDA in the I2C falls during the high-level period of the clock line SCL, it indicates the start of transmitting the data pulse signals, and the corresponding pulse waveform is the start pulse signal. When the data line SDA rises during the high-level period of the clock line SCL, it indicates the stop of transmitting the data pulse signals, and the corresponding pulse waveform is the stop pulse signal.

It can be seen from the above that, according to the present embodiment, the start pulse signal and the stop pulse signal are further set to represent the start of transmitting the data pulse signals and the stop of transmitting the data pulse signals, respectively, so as to more clearly determine the transmission status of the isolated communication data, thereby further improving the accuracy of transmission.

Figure 5:
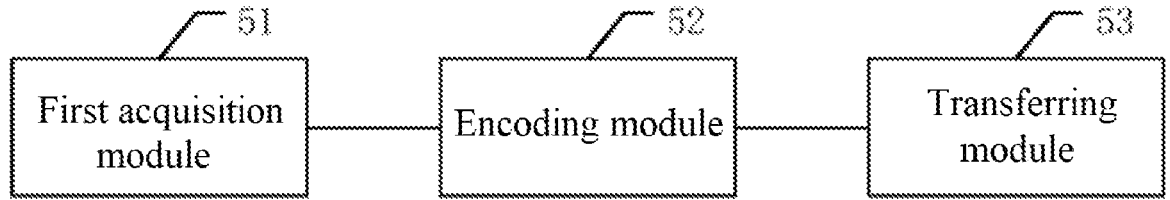
FIG. 5 is a schematic diagram of the structure of a serial isolated communication device according to an embodiment of the present invention.

The embodiment of the serial isolated communication method provided by the present invention is described in detail above. An embodiment of the present invention further provides a serial isolated communication device corresponding to the method mentioned above and applied to a transmitter of a serial isolated communication system. Specifically, FIG. 5 is a schematic diagram of the structure of the serial isolated communication device according to an embodiment of the present invention. As shown in FIG. 5, a serial isolated communication device, applied to a transmitter of a serial isolated communication system, includes:

the first acquisition module 51, configured to obtain isolated communication data to be transferred;

the encoding module 52, configured to encode isolated communication data with more than two bits into corresponding data pulse signals according to a preset encoding rule, wherein a group of data pulse signals include a positive pulse, a negative pulse, and a delay of 0 or N pulse widths between the positive pulse and the negative pulse, and N≥1; and the transferring module 53, configured to transfer the data pulse signals to a receiver.

The serial isolated communication device provided by the embodiment of the present invention has the advantages of the serial isolated communication method mentioned above.

Figure 6:
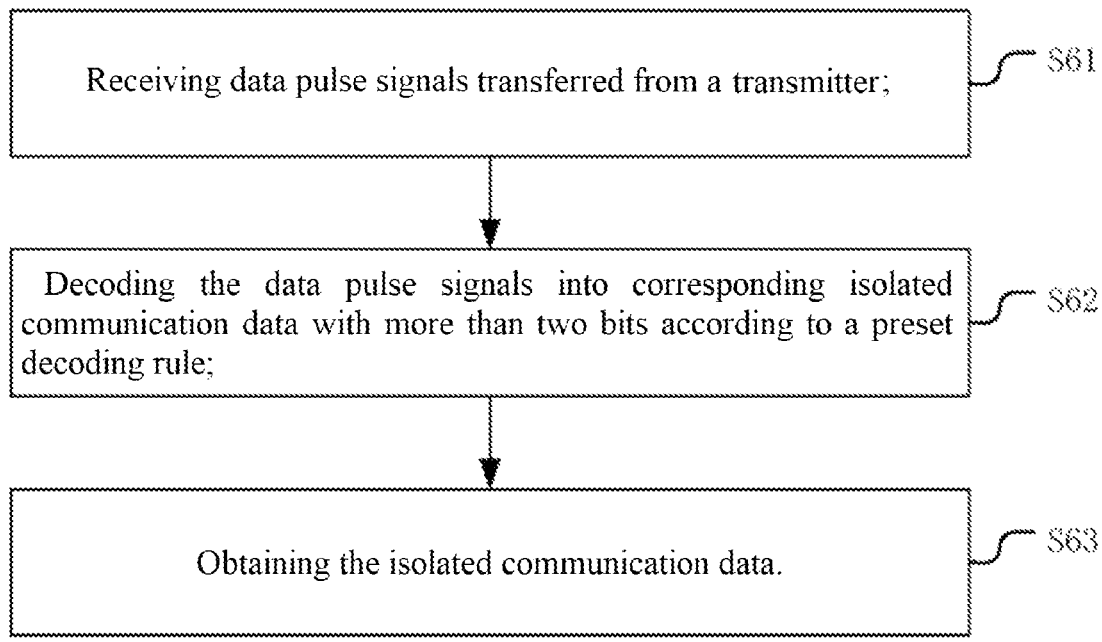
FIG. 6 is a flow chart of another serial isolated communication method according to an embodiment of the present invention.

FIG. 6 is a flow chart of another serial isolated communication method according to an embodiment of the present invention. Specifically, a serial isolated communication method according to the embodiment of the present invention, applied to a receiver in a serial isolated communication system, includes:

S61: data pulse signals transferred from a transmitter are received;

S62: the data pulse signals are decoded into corresponding isolated communication data with more than two bits according to a preset decoding rule, wherein a group of data pulse signals include a positive pulse, a negative pulse, and a delay of 0 or N pulse widths between the positive pulse and the negative pulse, and N≥1; and S63: the isolated communication data are obtained.

An embodiment of the present invention provides a serial isolated communication method, applied to a receiver in a serial isolated communication system. Compared with the prior art, in the present invention, data pulse signals transferred from a transmitter are received, and the data pulse signals are decoded into corresponding isolated communication data with more than two bits according to a preset decoding rule, wherein a group of data pulse signals include a positive pulse, a negative pulse, and a delay of 0 or N pulse widths between the positive pulse and the negative pulse, and N≥1. In this way, multiple waveforms can be used to represent multi-bit isolated communication data, and more isolated communication data can be transmitted in an identical time, that is, each waveform can transmit more isolated communication data, thereby improving the transmission rate and reducing the power consumption of transmitting the isolated communication data.

Figure 7:
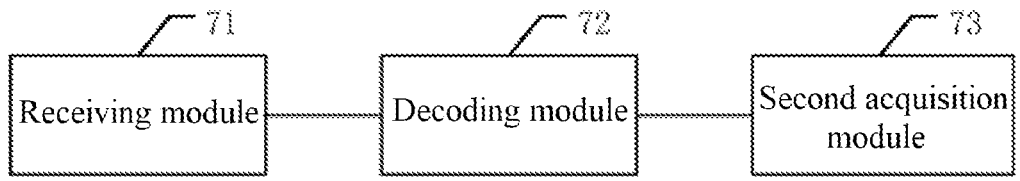
FIG. 7 is a schematic diagram of the structure of another serial isolated communication device according to an embodiment of the present invention.

An embodiment of the present invention further provides a serial isolated communication device corresponding to the method mentioned above and applied to a receiver of a serial isolated communication system. Specifically, FIG. 7 is a schematic diagram of the structure of another serial isolated communication device according to an embodiment of the present invention. As shown in FIG. 7, a serial isolated communication device, applied to a receiver of a serial isolated communication system, includes:

the receiving module 71, configured to receive data pulse signals transferred from a transmitter;

the decoding module 72, configured to decode the data pulse signals into corresponding isolated communication data with more than two bits according to a preset decoding rule, wherein a group of data pulse signals include a positive pulse, a negative pulse, and a delay of 0 or N pulse widths between the positive pulse and the negative pulse, and N≥1; and the second acquisition module 73, configured to obtain the isolated communication data.

The serial isolated communication device provided by the embodiment of the present invention has the advantages of the serial isolated communication method mentioned above.

Figure 8:
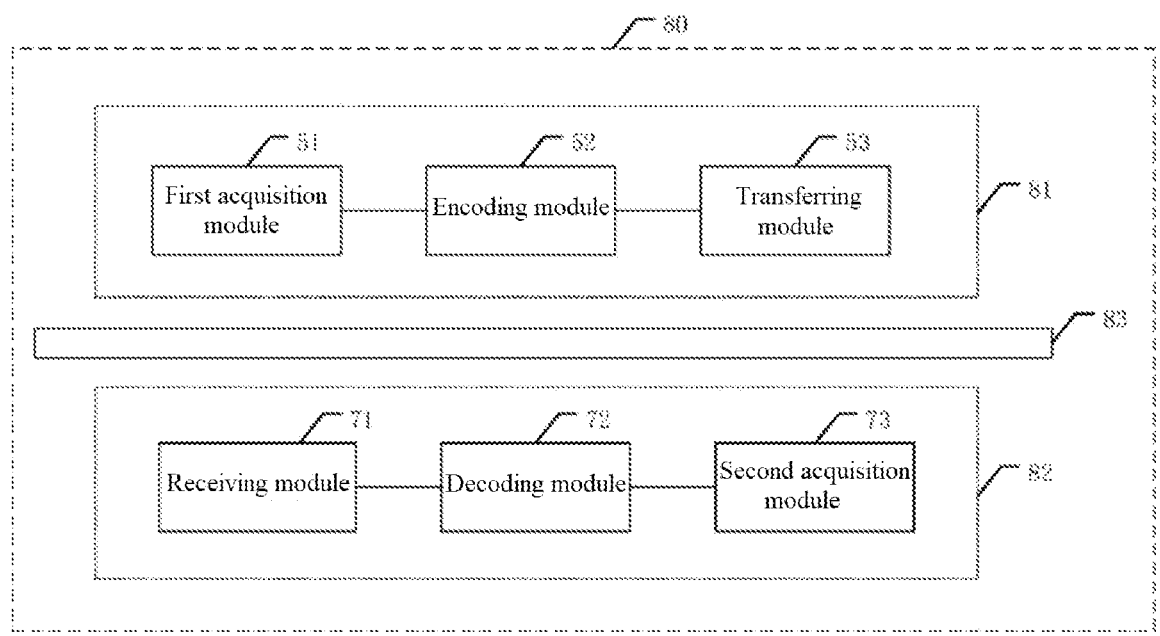
FIG. 8 is a schematic diagram of the structure of a serial isolated communication system according to an embodiment of the present invention.

An embodiment of the present invention further provides a serial isolated communication system. Specifically, as shown in FIG. 8, the serial isolated communication system 80 includes the transmitter 81 and the receiver 82, and the isolated communication medium 83 is provided between the transmitter 81 and the receiver 82 to form communication isolation between the transmitter 81 and the receiver 82.

Specifically, the transmitter 81 includes the first acquisition module 51, the encoding module 52 and the transferring module 53. The first acquisition module 51 is configured to obtain isolated communication data to be transferred. The encoding module 52 is configured to encode isolated communication data with more than two bits into corresponding data pulse signals according to a preset encoding rule, wherein a group of data pulse signals include a positive pulse, a negative pulse, and a delay of 0 or N pulse widths between the positive pulse and the negative pulse, and N≥1. The transferring module 53 is configured to transfer the data pulse signals to the receiver 82.

Specifically, the receiver 82 includes the receiving module 71, the decoding module 72 and the second acquisition module 73. The receiving module 71 is configured to receive data pulse signals transferred from a transmitter. The decoding module 72 is configured to decode the data pulse signals into corresponding isolated communication data with more than two bits according to a preset decoding rule, wherein a group of data pulse signals include a positive pulse, a negative pulse, and a delay of 0 or N pulse widths between the positive pulse and the negative pulse, and N≥1. The second acquisition module 73 is configured to obtain the isolated communication data.

The serial isolated communication system provided by the embodiment of the present invention has the advantages of any one of the serial isolated communication methods mentioned above.

The serial isolated communication method, device and system provided by the present invention are described above in detail. Herein, specific embodiments are used to explain the principle and implementation of the present invention, and the description of the above embodiments is only used to facilitate the understanding of the method and the core idea thereof of the present invention. It should be noted that for those having ordinary skill in the art, several improvements and modifications may be made to the present invention without departing from the principle of the present invention, and these improvements and modifications shall fall within the scope of protection of the claims of the present invention.

Each embodiment in the specification is described in a progressive manner, and each embodiment focuses on the description of the difference from other embodiments. The identical or similar parts of each embodiment can refer to each other. The device disclosed by embodiments corresponds to the method disclosed by embodiments, and is thus briefly described, and the relevant parts can refer to the description of the method.

Those skilled in the art should further realize that, in combination with the units and algorithm steps of the examples described in the embodiments disclosed herein, the present invention can be implemented by electronic hardware, computer software, or a combination of the electronic hardware and the computer software. In order to clearly illustrate the interchangeability of hardware and software, the compositions and steps of each example have been described in general terms in the above description. Whether these functions are performed by hardware or software depends on the specific applications and design constraints of the technical solutions. Those skilled in the art may use different manners to implement the described functions for each specific application, but such an implementation should not be considered as falling beyond the scope of the present invention.

What is claimed is:

1. A serial isolated communication method, applied to a transmitter of a serial isolated communication system, comprising:
   obtaining isolated communication data to be transferred;
   encoding isolated communication data with more than two bits into data pulse signals corresponding to the isolated communication data with more than two bits according to a preset encoding rule, wherein a group of the data pulse signals comprises a positive pulse, a negative pulse, and a delay of 0 or N pulse widths between the positive pulse and the negative pulse, and N≥1; and wherein the group of the data pulse signals is contained within a clock period; and
   transferring the data pulse signals to a receiver.

2. The serial isolated communication method of claim 1, wherein the delay between the positive pulse and the negative pulse is 0 or 1 pulse width.

3. The serial isolated communication method of claim 2, wherein before transferring the data pulse signals to the receiver, the serial isolated communication method further comprises:
   transferring a start pulse signal to the receiver; and
   after transferring the data pulse signals to the receiver, the serial isolated communication method further comprises:
   transferring a stop pulse signal to the receiver.

4. The serial isolated communication method of claim 3, wherein the start pulse signal or the stop pulse signal comprises the positive pulse, a delay of M pulse widths, and the negative pulse, wherein M≠N.

5. A serial isolated communication device, applied to a transmitter of a serial isolated communication system, comprising:
   a first acquisition module, configured to obtain isolated communication data to be transferred;
   an encoding module, configured to encode isolated communication data with more than two bits into data pulse signals corresponding to the isolated communication data with more than two bits according to a preset encoding rule, wherein a group of the data pulse signals comprises a positive pulse, a negative pulse, and a delay of 0 or N pulse widths between the positive pulse and the negative pulse, and N≥1; wherein the group of the data pulse signals is contained within a clock period; and
   a transferring module, configured to transfer the data pulse signals to a receiver.

6. A serial isolated communication method, applied to a receiver of a serial isolated communication system, comprising:
   receiving data pulse signals transferred from a transmitter;
   decoding the data pulse signals into isolated communication data with more than two bits corresponding to the data pulse signals according to a preset decoding rule, wherein a group of the data pulse signals comprises a positive pulse, a negative pulse, and a delay of 0 or N pulse widths between the positive pulse and the negative pulse, and N≥1; wherein the group of the data pulse signals is contained within a clock period; and
   obtaining the isolated communication data.

7. A serial isolated communication device, applied to a receiver of a serial isolated communication system, comprising:
   a receiving module, configured to receive data pulse signals transferred from a transmitter;
   a decoding module, configured to decode the data pulse signals into isolated communication data with more than two bits corresponding to the data pulse signals according to a preset decoding rule, wherein a group of the data pulse signals comprises a positive pulse, a negative pulse, and a delay of 0 or N pulse widths between the positive pulse and the negative pulse, and N≥1;
   wherein the group of the data pulse signals is contained within a clock period; and
   a second acquisition module, configured to obtain the isolated communication data.

8. A serial isolated communication system, comprising a transmitter and a receiver;
   wherein, the transmitter comprises:
   a first acquisition module, configured to obtain isolated communication data to be transferred;
   an encoding module, configured to encode isolated communication data with more than two bits into data pulse signals corresponding to the isolated communication data with more than two bits according to a preset encoding rule, wherein a group of the data pulse signals comprises a positive pulse, a negative pulse, and a delay of 0 or N pulse widths between the positive pulse and the negative pulse, and N≥1; wherein the group of the data pulse signals is contained within a clock period; and a transferring module, configured to transfer the data pulse signals to the receiver;

wherein, the receiver comprises:

a receiving module, configured to receive the data pulse signals transferred from the transmitter;

a decoding module, configured to decode the data pulse signals into the isolated communication data with more than two bits according to a preset decoding rule, wherein the group of the data pulse signals comprises the positive pulse, the negative pulse, and the delay of 0 or N pulse widths between the positive pulse and the negative pulse, and N≥1; wherein the group of the data pulse signals is contained within the clock period; and a second acquisition module, configured to obtain the isolated communication data.

\* \* \* \* \*